(12) United States Patent
Corry et al.

(10) Patent No.: US 9,057,030 B2
(45) Date of Patent: Jun. 16, 2015

(54) SYSTEM AND METHOD FOR PROTECTING GASIFIER QUENCH RING

(75) Inventors: Judeth Brannon Corry, Manvel, TX (US); James Michael Storey, Houston, TX (US); Paul Stephen Dimascio, Greer, SC (US); Wei Chen, Sugar Land, TX (US); Wade Albert Taber, Katy, TX (US); Delome Diane Fair, Houston, TX (US)

(73) Assignee: General Electric Company, Schenectady, NY (US)

( * ) Notice: Subject to any disclaimer, the term of this patent is extended or adjusted under 35 U.S.C. 154(b) by 453 days.

(21) Appl. No.: 12/916,527

(22) Filed: Oct. 30, 2010

(65) Prior Publication Data

US 2012/0102835 A1 May 3, 2012

(51) Int. Cl.
*B01J 7/00* (2006.01)
*C10J 3/48* (2006.01)
*C10J 3/84* (2006.01)
*C10J 3/74* (2006.01)
*C10J 3/76* (2006.01)
(Continued)

(52) U.S. Cl.
CPC *C10J 3/485* (2013.01); *Y02E 20/18* (2013.01); *Y02E 20/16* (2013.01); *C10J 3/845* (2013.01); *C10J 3/74* (2013.01); *C10J 3/76* (2013.01); *C10J 3/526* (2013.01); *C10J 3/78* (2013.01); *C10J 2300/093* (2013.01); *C10J 2300/0943* (2013.01); *C10J 2300/0956* (2013.01); *C10J 2300/0959* (2013.01); *C10J 2300/0976* (2013.01); *C10J 2300/1671* (2013.01); *C10J 2200/09* (2013.01)

(58) Field of Classification Search
CPC .......... C10J 3/845; C10J 2200/09; C10J 3/74; C10J 3/485; C10J 3/526; C10K 1/101
USPC .................................................. 422/129–242
See application file for complete search history.

(56) References Cited

U.S. PATENT DOCUMENTS 3,558,115 A 1/1971 Soneki et al.
3,675,908 A 7/1972 Amend
(Continued)

FOREIGN PATENT DOCUMENTS

CN 1944591 A 4/2007
CN 101550360 A 10/2009
(Continued)

OTHER PUBLICATIONS

EP Search Report and Opinion dated Mar. 20. 2012 from corresponding EP Application No. 11187156.2.
(Continued)

*Primary Examiner* — Imran Akram
(74) *Attorney, Agent, or Firm* — Fletcher Yoder P.C.

(57) ABSTRACT

A system includes a gasifier, which includes a reaction chamber configured to convert a feedstock into a synthetic gas, a quench chamber configured to cool the synthetic gas, a quench ring configured to provide a water flow to the quench chamber, and a quench ring protection system configured to protect the quench ring from the synthetic gas or a molten slag. The quench ring protection system includes a protective barrier disposed within an inner circumferential surface of the quench ring. The protective barrier substantially overlaps the inner circumferential surface in an axial direction along an axis of the quench ring.

19 Claims, 7 Drawing Sheets

(51) Int. Cl.
*C10J 3/52* (2006.01)
*C10J 3/78* (2006.01)

(56) References Cited

U.S. PATENT DOCUMENTS

| | | | |
|---|---|---|---|
| 3,871,839 A | 3/1975 | Moody | |
| 4,025,317 A | 5/1977 | Gencsoy | |
| 4,142,868 A | 3/1979 | Gencsoy et al. | |
| 4,153,427 A | 5/1979 | Bissett et al. | |
| 4,218,423 A | 8/1980 | Robin et al. | |
| 4,444,726 A | 4/1984 | Crotty, Jr. et al. | |
| 4,531,036 A | 7/1985 | Lewis | |
| 4,624,683 A | 11/1986 | Dach | |
| 4,717,128 A | 1/1988 | Bruckner et al. | |
| 4,788,003 A | 11/1988 | Najjar et al. | |
| 4,801,306 A | 1/1989 | Denbleyker | |
| 4,801,307 A | 1/1989 | Muenger et al. | |
| 4,808,197 A | 2/1989 | Ayers | |
| 4,828,578 A | 5/1989 | Den Bleyker | |
| 4,828,579 A | 5/1989 | Becker et al. | |
| 4,828,580 A | 5/1989 | Dach | |
| 4,844,752 A | 7/1989 | Bear | |
| 4,880,438 A | 11/1989 | Den Bleyker | |
| 4,902,303 A | 2/1990 | Den Bleyker | |
| 4,919,686 A | 4/1990 | Edwards | |
| 4,949,758 A | 8/1990 | Bear | |
| 4,992,081 A | 2/1991 | Den Bleyker | |
| 5,004,491 A | 4/1991 | McMaster et al. | |
| 5,401,006 A | 3/1995 | Canner | |
| 5,472,470 A | 12/1995 | Kormanyos et al. | |
| 5,851,497 A * | 12/1998 | Brooker et al. | 422/207 |
| 6,206,972 B1 | 3/2001 | Dunham | |
| 6,284,673 B2 | 9/2001 | Dunham | |
| 6,454,990 B1 | 9/2002 | Kichline, Jr. et al. | |
| 6,616,766 B2 | 9/2003 | Dunham | |
| 6,718,798 B2 | 4/2004 | Nitschke et al. | |
| 6,729,160 B1 | 5/2004 | Nitschke et al. | |
| 7,018,940 B2 | 3/2006 | Dunham | |
| 7,141,085 B2 | 11/2006 | Groen et al. | |
| 7,322,301 B2 | 1/2008 | Childs | |
| 2003/0140558 A1 | 7/2003 | Groen et al. | |
| 2005/0132647 A1 | 6/2005 | Groen | |
| 2007/0151085 A1 | 7/2007 | Groen et al. | |
| 2008/0034657 A1* | 2/2008 | Van Den Berg et al. | 48/62 R |
| 2009/0047193 A1* | 2/2009 | Corry et al. | 422/200 |
| 2010/0263278 A1* | 10/2010 | Kowoll et al. | 48/67 |
| 2011/0058991 A1* | 3/2011 | Kuske et al. | 422/187 |

FOREIGN PATENT DOCUMENTS

| | | |
|---|---|---|
| CN | 201406415 Y | 2/2010 |
| EP | 0374323 A1 | 6/1990 |
| WO | 2009/023364 A2 | 2/2009 |
| WO | WO 2009109285 A2 * | 9/2009 |

OTHER PUBLICATIONS

Unofficial English translation of CN Office Action dated Feb. 8, 2014 issued in connection with corresponding CN Application No. 201110430262.8.

* cited by examiner

US 9,057,030 B2

SYSTEM AND METHOD FOR PROTECTING GASIFIER QUENCH RING

BACKGROUND OF THE INVENTION

The subject matter disclosed herein relates to gasifiers and, more particularly, to systems and methods for the design of quench rings for gasifiers.

Gasifiers convert carbonaceous materials into a mixture of carbon monoxide and hydrogen, referred to as synthesis gas or syngas. For example, an integrated gasification combined cycle (IGCC) power plant includes one or more gasifiers that react a feedstock at a high temperature with oxygen and/or steam to produce syngas. Upon gasification, the resulting syngas may include less desirable components, such as ash. Accordingly, the syngas may be directed through a quench unit to cool the syngas to a saturation temperature and remove the less desirable components as a slag. However, the lifespan of certain components of the quench unit may be affected by exposure to the syngas and/or slag, which may reduce the efficiency and/or operating range of the gasifier.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasifier, which includes a reaction chamber configured to convert a feedstock into a synthetic gas, a quench chamber configured to cool the synthetic gas, a quench ring configured to provide a water flow to the quench chamber, and a quench ring protection system configured to protect the quench ring from the synthetic gas or a molten slag. The quench ring protection system includes a protective barrier disposed within an inner circumferential surface of the quench ring. The protective barrier substantially overlaps the inner circumferential surface in an axial direction along an axis of the quench ring.

In a second embodiment, a system includes a quench ring protection system configured to protect a quench ring from hot products of gasification. The quench ring protection system includes a refractory barrier configured to mount within an inner circumferential surface of the quench ring. The refractory barrier is configured to substantially block the inner circumferential surface in a radial direction relative to an axis of the quench ring.

In a third embodiment, a method includes gasifying a feedstock in a reaction chamber to generate a synthetic gas and quenching the synthetic gas in a quench chamber to cool the synthetic gas. Quenching includes providing a water flow from a quench ring. The method further includes protecting the quench ring with a refractory barrier completely overlapping an inner circumferential surface of the quench ring.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
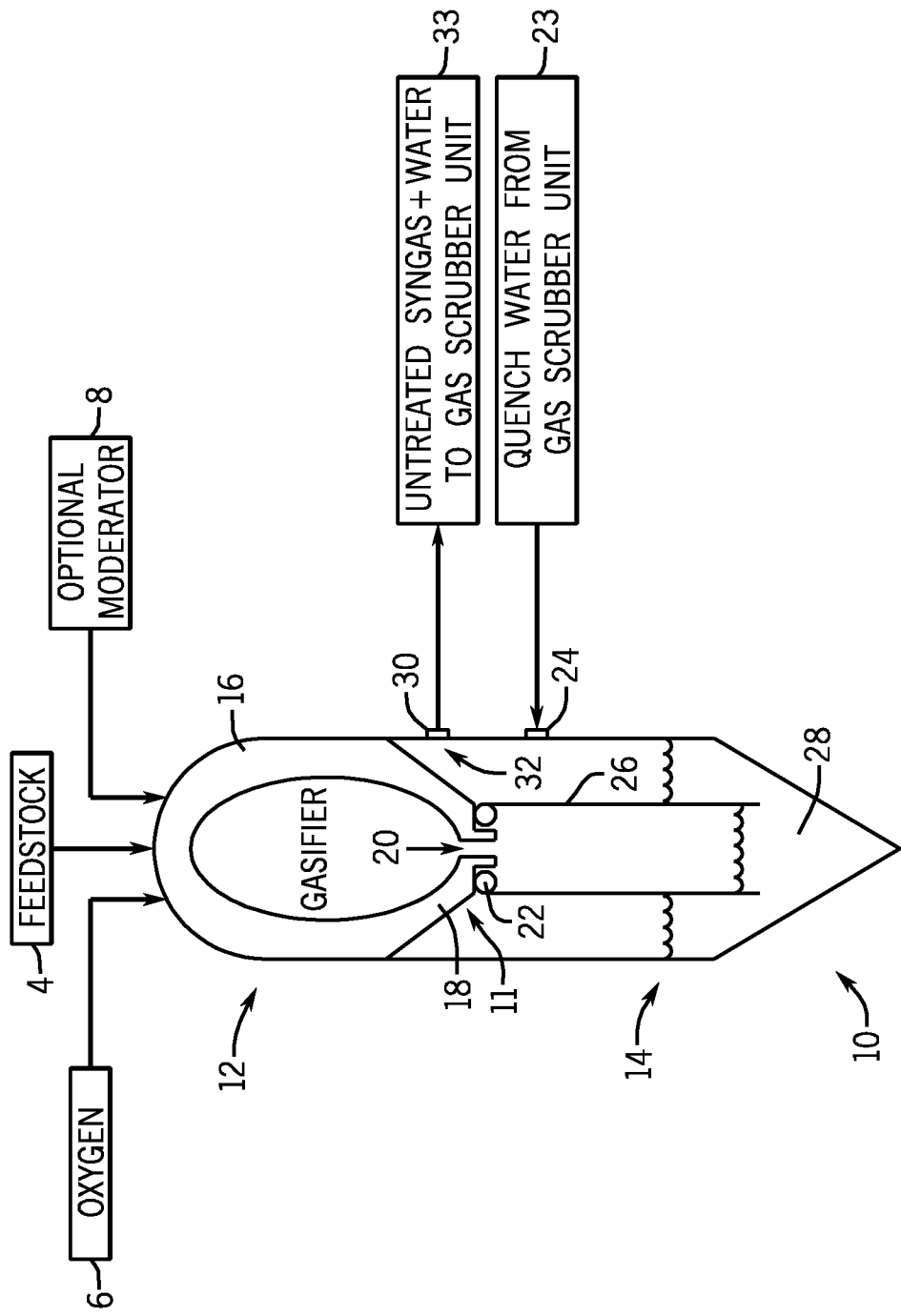
FIG. 1 is a schematic diagram of an exemplary embodiment of a gasifier incorporating a quench ring protection system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include gasifier systems that include a reaction chamber that is configured to convert a feedstock into a synthetic gas, a quench chamber that is configured to cool the synthetic gas, and a quench ring that is configured to provide a water flow to the quench chamber. The synthetic gas passing from the reaction chamber to the quench chamber may be at a high temperature, which may affect certain components of the quench ring. Thus, in certain embodiments, the gasifier includes a quench ring protection system that is configured to protect the quench ring from the synthetic gas and/or molten slag that may be produced in the reaction chamber. The synthetic gas and molten slag may collectively be referred to as hot products of gasification. In some embodiments, an inner circumferential surface of the quench ring may be exposed to the synthetic gas and/or molten slag. Thus, the quench ring protection system may include a protective barrier (e.g., a thermal, chemical, or refractory barrier), that is disposed within the inner circumferential surface of the quench ring. As discussed in detail below, the protective barrier of the quench ring protection system may be configured differently or be made from different materials in various embodiments. For example, the protective barrier may substantially or completely overlap the inner circumferential surface of the quench ring in an axial direction along an axis of the quench ring. By substantially overlapping the inner circumferential surface, the protective barrier may protect the quench ring from the effects of the synthetic gas and/or molten slag. By protecting the quench ring, the quench ring protection system may reduce the frequency of gasifier maintenance and thus, expand the operability of the gasifier. In further embodiments, a method may include gasifying a feedstock in the reaction chamber to generate the synthetic gas, quenching the synthetic gas in the quench chamber to cool the synthetic gas, and protecting the quench ring with a protective barrier (e.g., a thermal, chemical, or refractory barrier), that substantially or completely overlaps the inner circumferential surface of the quench ring.

FIG. 1 is a schematic diagram of an exemplary embodiment of a gasifier 10, which may include a quench ring protection system 11. The gasifier 10 may be divided into a reaction chamber 12 and a quench chamber 14. In other embodiments, a synthetic gas cooler may be disposed between the reaction chamber 12 and the quench chamber 14. A protective barrier 16 may define the reaction chamber 12. The protective barrier 16 may act as a physical barrier, a thermal barrier, a chemical barrier, or any combination thereof. Examples of materials that may be used for the protective barrier 16 include, but are not limited to, refractory materials, refractory metals, non-metallic materials, clays, ceramics, cermets, and oxides of aluminum, silicon, magnesium, and calcium. In addition, the materials used for the protective barrier 16 may be bricks, castable, coatings, or any combination thereof. A feedstock 4, along with oxygen 6 and an optional moderator 8, such as steam, may be introduced through one or more inlets into the reaction chamber 12 of the gasifier 10 to be converted into a raw or untreated synthetic gas, e.g., a combination of carbon monoxide and hydrogen, which may also include slag and other contaminants. In certain embodiments, air or oxygen-enhanced air may be used instead of the oxygen 6. The untreated synthesis gas may also be described as untreated gas. The conversion in the gasifier 10 may be accomplished by subjecting the feedstock to steam and oxygen at elevated pressures, e.g., from approximately 20 bar to 100 bar, or 30 to 85 bar, and temperatures, e.g., approximately 1100 degrees C. to 1450 degrees C., depending on the type of gasifier 10 utilized. Under these conditions, the slag is in the molten state and is referred to as molten slag. In other embodiments, the molten slag may not be entirely in the molten state. For example, the molten slag may include solid (non-molten) particles suspended in molten slag.

The high-pressure, high-temperature untreated synthetic gas from the reaction chamber 12 may enter a quench chamber 14 through a bottom end 18 of the protective barrier 16, as illustrated by arrow 20. In other embodiments, the untreated synthetic gas passes through the syngas cooler before entering the quench chamber 14. In general, the quench chamber 14 may be used to reduce the temperature of the untreated synthetic gas. In certain embodiments, a quench ring 22 may be located proximate to the bottom end 18 of the protective barrier 16. The quench ring 22 is configured to provide quench water to the quench chamber 14. In certain embodiments, the configuration of the protective barrier 16 may protect the quench ring 22 from the synthetic gas and/or molten slag, and thus, the protective barrier 16 may constitute part of the quench ring protection system 11. As illustrated, quench water 23 from a gas scrubber unit 33 may be received through a quench water inlet 24 into the quench chamber 14. In general, the quench water 23 may flow through the quench ring 22 and down a dip tube 26 into a quench chamber sump 28. As such, the quench water 23 may cool the untreated synthetic gas, which may subsequently exit the quench chamber 14 through a synthetic gas outlet 30 after being cooled, as illustrated by arrow 32. In other embodiments, a coaxial draft tube may surround the dip tube 26 to create an annular passage through which the untreated synthetic gas may rise. In further embodiments, a spray quench system may be used to help cool the untreated synthetic gas. The synthetic gas outlet 30 may generally be located separate from and above the quench chamber sump 28 and may be used to transfer the untreated synthetic gas and any water to the gas scrubber unit for treatment, as indicated by block 33. For example, the gas scrubber unit 33 may remove fine solid particles and other contaminants. In addition, the gas scrubber 33 unit may remove entrained water from the untreated synthetic gas, which may then be used as quench water within the quench chamber 14 of the gasifier 10. The treated synthetic gas from the gas scrubber unit 33 may ultimately be directed to a chemical process or a combustor of a gas turbine engine, for example.

Figure 2:
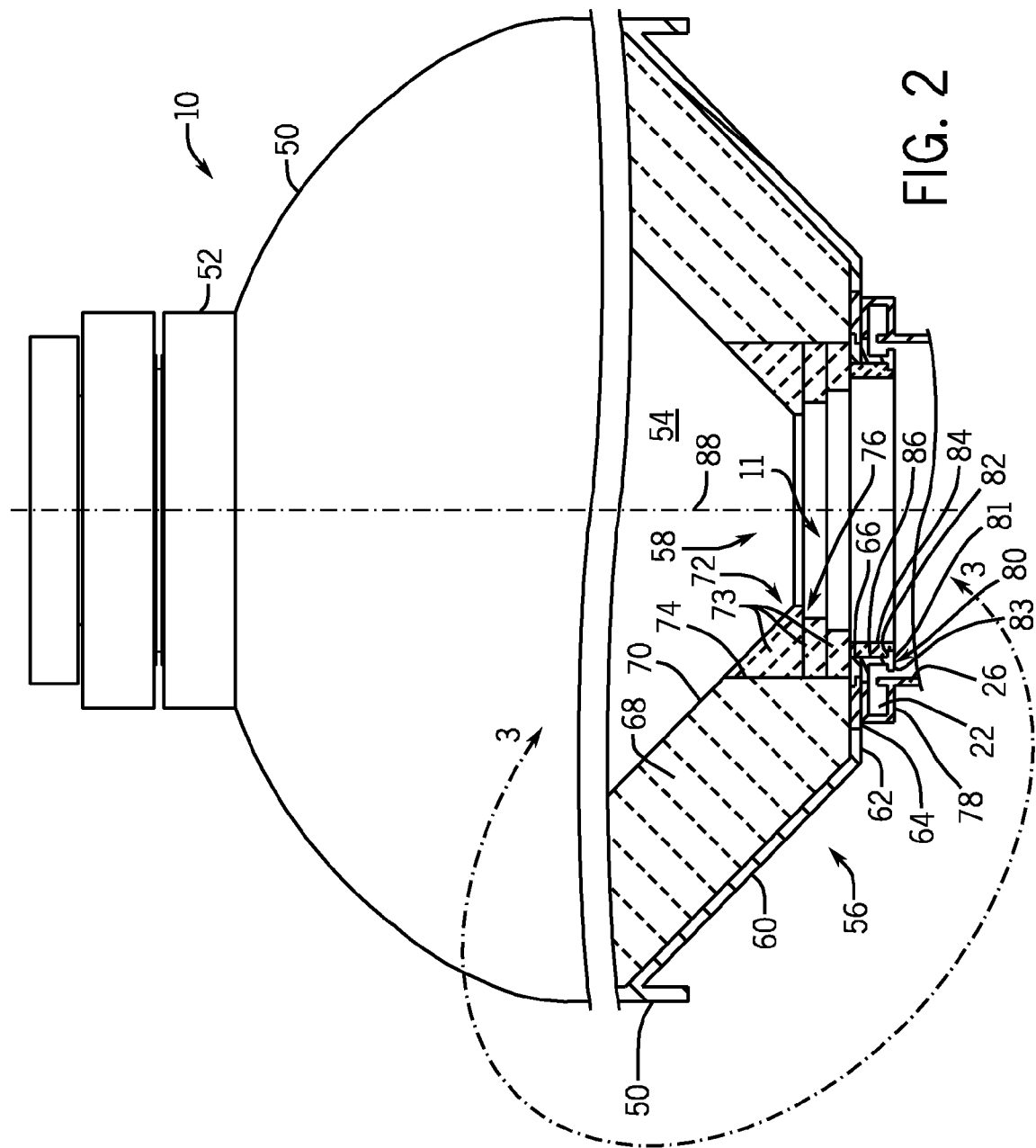
FIG. 2 is a partial schematic view of a gasifier incorporating a quench ring protection system according to an embodiment.

FIG. 2 is a partial schematic view of the gasifier 10 incorporating an embodiment of the quench ring protection system 11. Elements in FIG. 2 in common with those shown in FIG. 1 are labeled with the same reference numerals. The gasifier 10 includes an outer vessel or shell 50 having a top neck portion 52, a gasification section 54, and a floor section 56. The floor section 56 may also be referred to as a transition section between the reaction chamber 12 and the quench chamber 14. An opening 58 in the floor section 56, also referred to as a throat opening or gasifier throat, leads to the quench chamber 14 of the gasifier 10. A portion of the floor section 56 may be in the form of a frustum of an upside down conical shell. Specifically, the floor section 56 may include a conical floor section 60, or conical floor or conical refractory section, formed of substantially the same metal used to form the gasifier shell 50, such as steel. The conical floor section 60 may be coupled to a generally horizontal portion 62, which in turn may be coupled to a removable floor plate 64 (e.g., removable ring-shaped floor plate), which may be omitted in certain embodiments. The removable floor plate 64 may be used to support and/or provide access to the quench ring 22, as described in detail below. In other words, the quench ring 22 may be coupled to the removable floor plate 64. The horizontal portion 62 may serve as a transition between the conical floor section 60 and the removable floor plate 64. In certain embodiments, a replaceable insert 66 may be coupled to the removable floor plate section 64. The location of the replaceable insert 66 near the opening 58 may be more susceptible to the effects of the synthetic gas and/or molten slag. Thus, the inclusion of the replaceable insert 66 in some embodiments enables the replaceable insert 66 to be replaced separately from the rest of the floor section 56.

In certain embodiments, a refractory lining 68, which is part of the protective barrier 16, may be formed from a ceramic material, for example, and overlay the conical floor section 60, the horizontal floor portion 62, the removable floor plate 64, and/or the replaceable insert 66. The refractory lining 68 is generally annular shaped, and may include conical shaped portions and cylindrical shaped portions. Other materials that may be used for the refractory lining 68 include those listed above for the protective barrier 16. The refractory lining 68 also extends upwardly along an inside surface of the gasifier shell 50. The refractory lining 68 protects the steel shell 50 and the floor section 56 from the extreme temperature conditions and thermal-chemical degradation that can occur to steel during gasification. In some embodiments, the refractory lining 68 includes refractory bricks, or hotface bricks, having a hotface surface 70 that is directly exposed to the environment in the gasification section 54 of the gasifier 10, where gasification occurs. In further embodiments, a throat refractory 72, which is also part of the protective barrier 16, may be provided at the opening 58. The throat refractory 72 is generally annular shaped, and may include conical shaped portions and cylindrical shaped portions. In certain embodiments, the throat refractory 72 may be made of a different material or the same material as the refractory lining 68. The throat refractory 72 may also wear faster than the refractory lining 68. Thus, the throat refractory 72 may need periodic replacement, while major sections of the refractory lining 68 elsewhere in the gasifier 10 may remain in place for continued usage. The throat refractory 72 may also include refractory bricks 73, as illustrated in FIG. 2. The refractory bricks 73 of the refractory lining 68 and/or the throat refractory 72 may have a generally rectangular cross section, a wedge-shaped cross-section, or another cross-sectional shape. These bricks are arranged circumferentially about the interior of the gasifier 10 to define an annular array of bricks. In addition, the throat refractory 72 may be attached to the refractory lining 68 at an interface 74. Various methods, such as, but not limited to, anchors, cements, adhesives, fasteners, interlocking joints, and so forth, may be used at the interface 74 to couple the throat refractory 72 to the refractory lining 68. Further, the throat refractory 72 may be configured to incorporate an overlapping drip edge 76, which may help to locate dripping molten slag away from the quench ring 22. The overlapping drip edge 76 may be at least part of the quench ring protection system 11.

In certain embodiments, the quench ring 22 is joined to the undersurface of the removable floor plate 64 and the replaceable insert 66. The quench ring 22 includes a water cooling system, which may help to lower a temperature of the overlying floor plate 64 and/or the replaceable insert 68. Thus, the quench ring 22 may help to retard metal wastage of the floor plate 64 and/or the replaceable insert 68 caused by thermal and thermal-chemical conditions inside the gasifier 10. As described in detail below, the quench ring protection system 11 may help prevent thermal and thermal-chemical damage, as well as slag damage, to the quench ring 22.

In the illustrated embodiment, the quench ring 22 includes an outer annular segment 78 and an inner annular segment 80. The inner annular segment 80 faces the synthetic gas passing through the opening 58 and is more likely to be affected by the synthetic gas than the outer annular segment 78. Thus, the configuration of the quench ring 22 with the inner and outer annular segments 78 and 80 enables the inner annual segment 80 to be replaced separately from the rest of the quench ring 22. In the illustrated embodiment, the outer annular segment 78 contains the quench water, which flows over the dip tube 26. The inner annular segment 80 may include a ledge 82, which has a radial inward ledge portion 81 and a radial outward ledge portion 83. In the illustrated embodiment, the radial inward ledge portion 81 is configured to help support a quench ring refractory material 84 (e.g., annular protective barrier), which may be made from a material similar to the refractory lining 68 and/or throat refractory 72. For example, the quench ring refractory material 84 may be made from refractory materials, refractory metals, non-metallic materials, clays, ceramics, cermets, and oxides of aluminum, silicon, magnesium, and calcium. In certain embodiments, the quench ring refractory material 84 may be part of the throat refractory 72 and may be configured as refractory bricks 73. In the illustrated embodiment, the quench ring refractory material 84 directly contacts an inner circumferential surface 86 of the inner annular segment 80. In other words, the quench ring refractory material 84 is disposed within the inner circumferential surface 86. In the illustrated embodiment, the quench ring refractory material 84 completely overlaps the inner circumferential surface 86 in the axial direction along an axis 88 of the quench ring 22, thereby protecting the quench ring 22 from the synthetic gas and/or molten slag. Thus, the quench ring refractory material 84 defines a protective barrier for the quench ring 22 in the radial direction relative to the axis 88. Complete overlap may refer to approximately 100% overlap. Specifically, the quench ring refractory material 84 may provide thermal insulation and/or protection against molten slag for the inner circumferential surface 86. In addition, the quench ring refractory material 84 may result in a uniform and lower temperature profile of the inner circumferential surface 86, which may reduce the possibility of corrosion and/or cracking caused by creep or thermal fatigue that occurs at high temperatures. In other embodiments, the quench ring refractory material 84 may only substantially overlap the inner circumferential surface 86. In other words, the quench ring refractory material 84 may overlap greater than approximately 50 percent, 60 percent, 70 percent, 80 percent, or 90 percent of the inner circumferential surface 86. Thus, the quench ring refractory material 84 constitutes at least part of the quench ring protection system 11 of the embodiment illustrated in FIG. 2, which may help to reduce the frequency of quench ring 22 and/or floor plate 64 maintenance.

Figure 3:
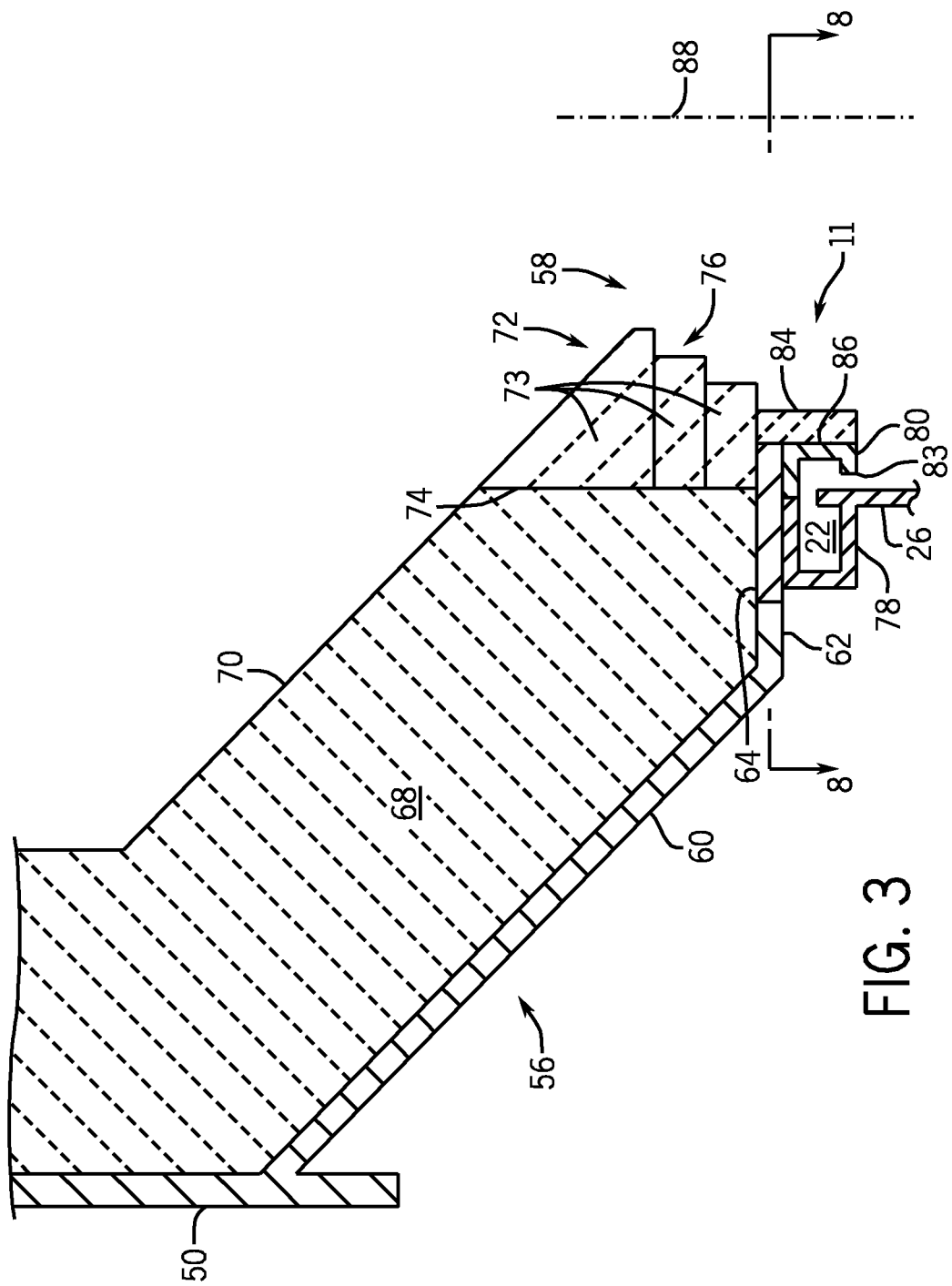
FIG. 3 is a partial axial cross-sectional view of an embodiment of a gasifier incorporating a quench ring protection system taken within line 3-3 of FIG. 2.

FIG. 3 is a partial axial cross-sectional view of the gasifier 10, illustrating an embodiment of the quench ring protection system 11. Elements in FIG. 3 in common with those shown in FIG. 2 are labeled with the same reference numerals. In the illustrated embodiment, the inner ring 66 is omitted, which reduces the movement of the floor section 56 and enhances the stability of the refractory lining 68. Instead, the quench ring 22 is supported entirely from the floor plate 64. Further, in certain embodiments, the inner annular segment 80 of the quench ring 22 does not include the radial inward ledge portion 81, which avoids the possible overheating of the ledge portion 81 and accompanying loss of support functionality. Thus, the quench ring refractory material 84 (e.g., annular protective barrier), which constitutes at least part of the quench ring protection system 11 of the illustrated embodiment, is coupled directly to the inner circumferential surface 86. For example, the inner circumferential surface 86 may include anchors to enable the quench ring refractory material 84 to be coupled to the inner annular segment 80. In other embodiments, suitable methods, such as cements, adhesives, fasteners, interlocking joints, and so forth, may be used to attach the quench ring refractory material 84 to the inner annular segment 80. In further embodiments, the inner circumferential surface 86 may be tapered or conical, thereby creating a wedge to keep the quench ring refractory material 84 in place. In addition, a portion of the quench ring refractory material 84 may be coupled to the floor plate 64. Other aspects of the quench ring protection system 11 of FIG. 3 are similar to those described in detail above. For example, the quench ring refractory material 84 (e.g., annular protective barrier), which constitutes part of the quench ring protection system 11, completely overlaps the inner circumferential surface 86 in the axial direction along the axis 88. Thus, the quench ring refractory material 84 defines a protective barrier for the quench ring 22 in the radial direction relative to the axis 88. In other embodiments, the quench ring refractory material 84 may only substantially overlap the inner circumferential surface 86. In other words, the quench ring refractory material 84 may overlap greater than approximately 50 percent, 60 percent, 70 percent, 80 percent, or 90 percent of the inner circumferential surface 86.

Figure 4:
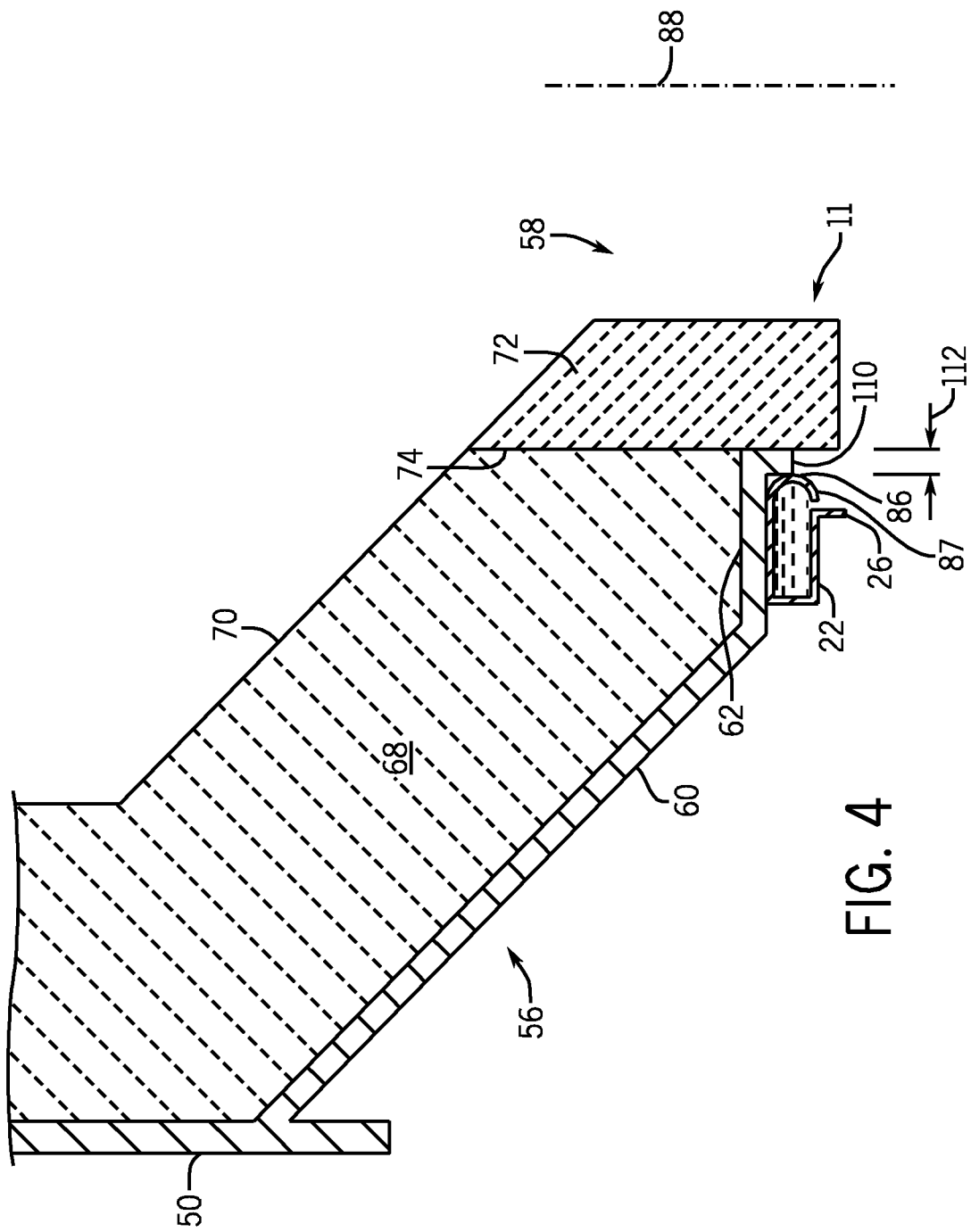
FIG. 4 is a partial axial cross-sectional view of an embodiment of a gasifier incorporating a quench ring protection system taken within line 3-3 of FIG. 2.

FIG. 4 is a partial axial cross-sectional view of the gasifier 10, illustrating an embodiment of the quench ring protection system 11. Elements in FIG. 4 in common with those shown in FIG. 2 are labeled with the same reference numerals. In the illustrated embodiment, both the removable floor plate 64 and the inner ring 66 are omitted. Instead, the quench ring 22 is supported entirely from the horizontal floor portion 62. In addition, the quench ring 22 is configured differently from the embodiments described above. Specifically, in the illustrated embodiment, the inner circumferential surface 86 has a curved shape 87, such as a C-shape, rather than the generally flat faces of the embodiments described above. Further, the horizontal floor portion 62 includes a shelf extension 110, which may be an annular extension extending axially along a portion of the quench ring 22. The shelf extension 110 also may facilitate installation of the throat refractory 72 (e.g., annular protective barrier), which constitutes at least part of the quench ring protection system 11 of the illustrated embodiment. Specifically, in certain embodiments, the shelf extension 110 may include anchors to help couple the throat refractory 72 to the horizontal floor portion 62 and the refractory lining 68. Because of the shelf extension 110, the throat refractory 72 is not in direct contact with the inner circumferential surface 86. Thus, a gap 112 exists between the inner annular segment 86 and throat refractory 72. In other words, the throat refractory 72 is radially offset by the gap 112 from the inner circumferential surface 86. However, the throat refractory 72 is still configured to substantially block the inner circumferential surface 86 in a radial direction relative to the axis 88 of the quench ring 22. In other words, the throat refractory 72 completely overlaps the quench ring 22, in the axial direction along the axis 88, thereby protecting the quench ring 22 from the synthetic gas and/or molten slag. In other embodiments, the quench ring refractory material 84 may only substantially overlap the inner circumferential surface 86. In other words, the quench ring refractory material 84 may overlap greater than approximately 50 percent, 60 percent, 70 percent, 80 percent, or 90 percent of the inner circumferential surface 86. Other aspects of the quench ring protection system 11 of FIG. 4 are similar to those described in detail above.

Figure 5:
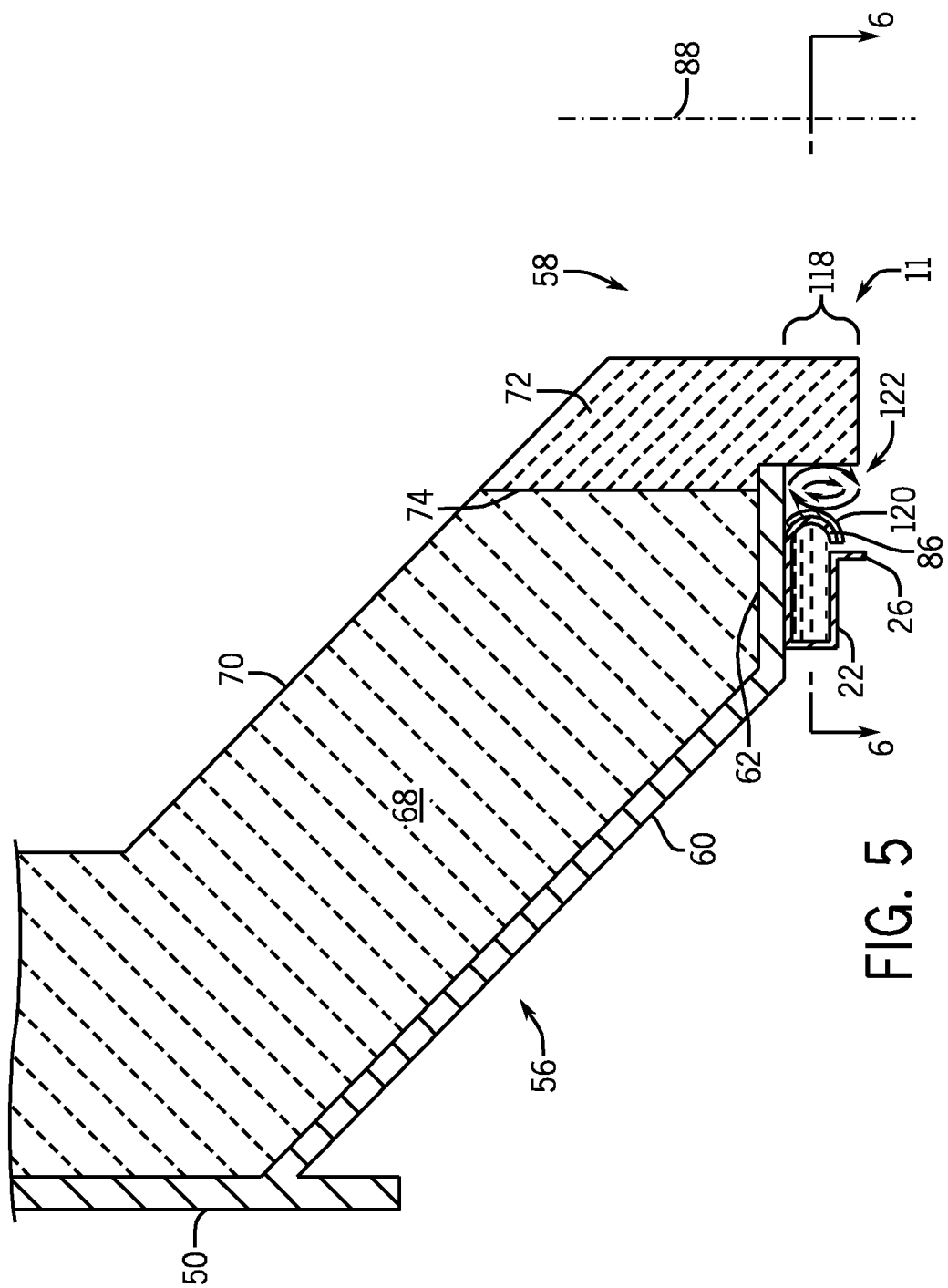
FIG. 5 is a partial axial cross-sectional view of an embodiment of a gasifier incorporating a quench ring protection system taken within line 3-3 of FIG. 2.

FIG. 5 is a partial axial cross-sectional view of the gasifier 10, illustrating an embodiment of the quench ring protection system 11. Elements in FIG. 5 in common with those shown in FIG. 2 are labeled with the same reference numerals. In the illustrated embodiment, the horizontal floor portion 62 supports a portion of the throat refractory 72. The horizontal floor portion 62 extends radially inward toward the axis beyond the interface 74, thereby defining support for the throat refractory 72 in the axial direction along the axis 88. Thus, the shelf extension 110 may be omitted. A portion 118 of the throat refractory 72 (e.g., annular protective barrier), which constitutes part of the quench ring protection system 11, overhangs the horizontal floor portion 62 and completely overlaps the quench ring 22 in the axial direction along the axis 88. Thus, the throat refractory 72 defines a protective barrier for the quench ring 22 in the radial direction relative to the axis 88. In other embodiments, the throat refractory 72 may only substantially overlap the inner circumferential surface 86. In other words, the throat refractory 72 may overlap greater than approximately 50 percent, 60 percent, 70 percent, 80 percent, or 90 percent of the inner circumferential surface 86. In certain embodiments, a protective coating 120, which may constitute part of the quench ring protection system 11, may further protect the inner circumferential surface 86 of the quench ring 22. The coating 120 may act as a physical barrier, a thermal barrier, a chemical barrier, or any combination thereof. Examples of materials that may be used for the coating 120 include, but are not limited to, a refractory material, refractory metals, non-metallic materials, clays, ceramics, cermets, and oxides of aluminum, silicon, magnesium, and calcium. The specific material, thickness, and/or configuration of the coating 120 may be selected based on the conditions of a particular application. Further, the radial offset 112 between the inner circumferential surface 86 of the quench ring 22 and the overhanging portion 118 of the throat refractory 72 may create a recirculation zone 122, or recirculation region, which may constitute another part of the quench ring protection system 11. Specifically, the synthetic gas may circulate upward along the dip tube 26 toward the zone 122 between the quench ring 22 and the throat refractory 72, such that the synthetic gas is cooled by water flowing along the dip tube 26 before reaching the zone 122. Upon reaching the zone 122, the cooled synthetic gas recirculates in the zone 122 to help cool the quench ring 22. Thus, the combination of the throat refractory 72, the coating 120, and the recirculation zone 122 may constitute at least part of the quench ring protection system 11.

Figure 6:
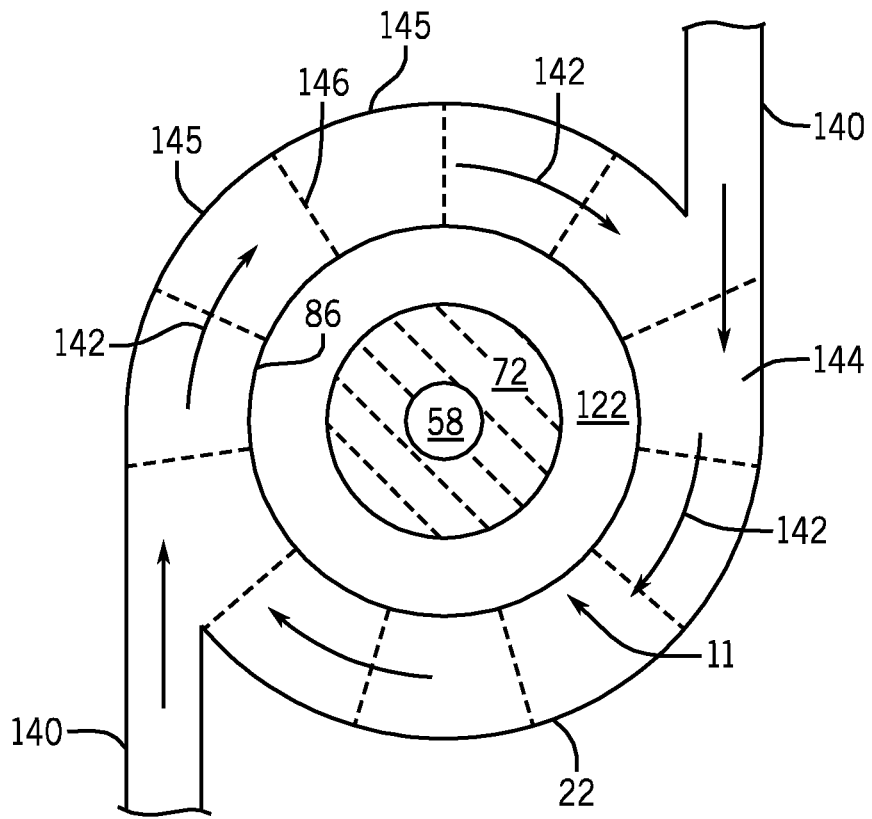
FIG. 6 is a radial cross-sectional view of an embodiment of a quench ring protected by a quench ring protection system taken along line 6-6 of FIG. 5.

FIG. 6 is a radial cross-sectional view of an embodiment of the quench ring protective system 11 along the line labeled 6-6 in FIG. 5. Correspondingly, the axial cross-sectional view of FIG. 5 is indicated along the line labeled 5-5 in FIG. 6. Elements in FIG. 6 in common with those shown in FIG. 2 are labeled with the same reference numerals. In the illustrated embodiment, the inner annular surface 86 of the quench ring system 22 faces the recirculation zone 122. Further, the throat refractory 72 is adjacent to the recirculation zone 122, and the opening 58 is near the center of the throat refractory 72. In certain embodiments, two tangential inlet nozzles 140 are coupled to the quench ring 22 and are separated by approximately 180 degrees. Other embodiments may include any number (e.g., 1 to 20 or more) of tangential inlet nozzles 140, spaced evenly or irregularly apart from one another. The tangential inlet nozzles 140 help the incoming water to the quench ring 22 to flow in a swirling motion about the axis 88, as indicated by arrows 142, through an annular interior 144 of the quench ring 22. Such a rotational path of the water within the annular interior 144 of the quench ring 22 may help to cool the surfaces of the quench ring 22 evenly. In addition, the swirling water may help to cool other components of the quench ring protection system 11. Further, the swirling motion 142 of the water through the annular interior 144 of the quench ring 22 may continue after the water exits the quench ring 22, for example, along a surface of the dip tube 26. In other embodiments, the nozzles 140 are not arranged tangentially. For example, the nozzles 140 may be arranged radially and the water flowing through the annular interior 144 may follow a radial path from an outer edge of the quench ring 22 toward the inner annular surface 86. Other configurations of the nozzles 140 are possible. For example, the nozzles 140 may be located below the quench ring 22 and direct the water in an upward manner. Because the nozzles 140 may help to protect the quench ring 22, the nozzles 140 may constitute part of the quench ring protection system 11.

Further, the quench ring 22 may be divided into one or more arcuate ring segments 145 along connections 146, which may be coupled together via welds, flanges, bolts, interference fits, or other couplings, as illustrated in FIG. 6.

The arcuate ring segments 145 may be spaced circumferentially about the axis 88 of the quench ring 22. Moreover, the connections 146 may be spaced evenly or irregularly apart from one another. In addition, the connections 146 may facilitate installation or removal of the quench ring 22 from the gasifier 10. For example, the assembled quench ring 22 may be too large to pass through a maintenance opening of the gasifier 10. Using the connections 146, individual segments of the quench ring 22 may be passed through the maintenance opening of the gasifier 10 and assembled or disassembled inside the gasifier 10. In addition, the connections 146 enable select portions of the quench ring 22 to be removed for maintenance, while other portions of the quench ring 22 may remain in place. Finally, the number of connections 146 provided in the quench ring 22 may be based in part on the size of the maintenance opening of the gasifier 10.

Figure 7:
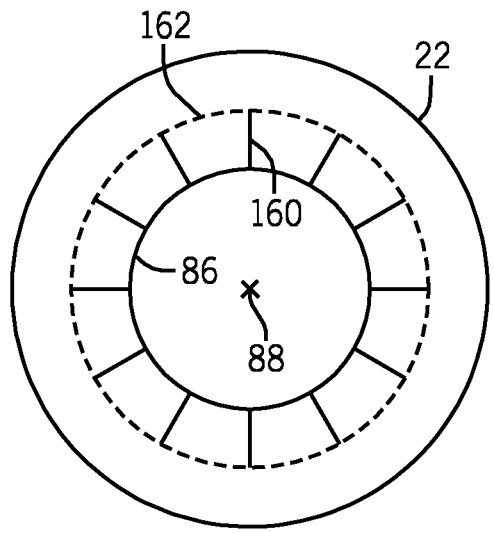
FIG. 7 is a top view of an embodiment of a quench ring that may be used with a quench ring protection system.

FIG. 7 is a top view of an embodiment of the quench ring 22. Elements in FIG. 7 in common with those shown in FIG. 2 are labeled with the same reference numerals. In the illustrated embodiment, the quench ring 22 includes one or more radial slots 160 disposed along the inner circumferential surface 86. The radial slots 160 may be spaced evenly or irregularly apart from one another, circumferentially about the axis 88 along the surface 86. In addition, in various embodiments, the radial slots 160 may be provided on an axial upper surface, an axial lower surface, or both the axial upper and lower surfaces of the quench ring 22. In further embodiments, the radials slots 160 may overlap with one another. Thus, the radial slots 160 may extend partially or completely through the quench ring 22 in the axial direction along the axis 88. The radial slots 160 may help the quench ring 22 to respond to thermal stress and/or strain caused by temperature fluctuations within the gasifier 10. In other words, the radial slots 160 may enable the quench ring 22 to expand or contract in response to temperature fluctuations without creating excessive thermal stress and/or strain. Without the radial slots 160, the lifespan of the quench ring 22 may be affected by the unrelieved thermal stress and/or strain, which may lead to the formation of low cycle fatigue cracks. Because the radial slots 160 may help to protect the quench ring 22, the radial slots 160 may constitute part of the quench ring protection system 11. In the illustrated embodiment, the radial slots 160 do not extend all the way through the quench ring 22 in the radial direction relative to the axis 88. Instead, the radial slots 160 may extend only as far as a circle 162 indicated by a dashed line in FIG. 7. Thus, the radial slots 160 may be provided where the thermal stress and/or strain may be the greatest, namely near the inner circumferential surface 86.

Figure 8:
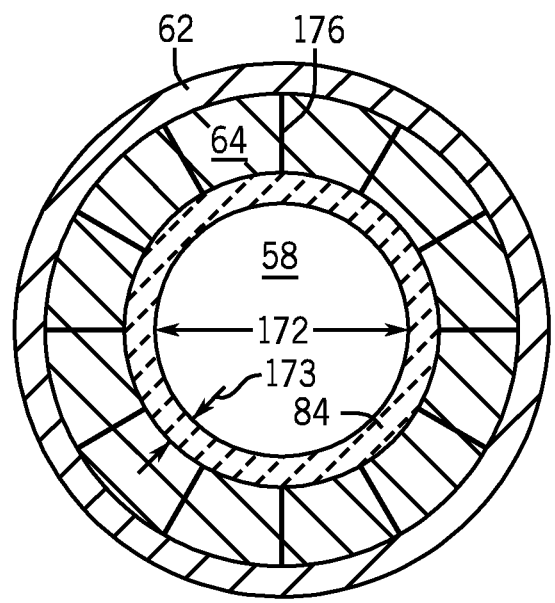
FIG. 8 is a radial cross-sectional view of floor plates that may be used with a quench ring protection system according to an embodiment.

FIG. 8 is a radial cross-sectional view of the gasifier 10 along the line labeled 8-8 in FIG. 3. Correspondingly, the axial cross-section of FIG. 3 is indicted along the line labeled 3-3 in FIG. 8. Elements in FIG. 8 in common with those shown in FIG. 2 are labeled with the same reference numerals. In the illustrated embodiment, the radial cross-section passes through the horizontal floor portion 62, the floor plate 64, the quench ring refractory material 84, and the opening 58. The opening 58 may be defined by a diameter 172. In certain embodiments, the diameter 172 may be adjusted by varying a thickness 173 of the quench ring refractory material 84. Adjusting the diameter 172 may facilitate increasing the operating range of the gasifier 10. For example, the diameter 172 may be increased to enable the gasifier 10 to operate at higher flow rates.

In certain embodiments, the floor plate 64, or removable floor section, shown in FIG. 8 may be divided into one or more arcuate floor segments 174 along seams 176, which may be spaced evenly or irregularly apart from one another. The arcuate floor segments 174 may be coupled to one another at the seams 176, or the segments 174 may be placed adjacent to one another without any connections. Further, the seams 176 may facilitate installation or removal of the arcuate floor segments 174 from the gasifier 10. For example, the entire floor plate 64 may be too large to pass through the maintenance opening of the gasifier 10. Using the seams 176 individual arcuate floor segments 174 may be passed through the maintenance opening of the gasifier 10. In addition, the seams 176 enable only select arcuate floor segments 174 to be removed for maintenance, while other segments 174 remain in place. In certain embodiments, the arcuate floor segments 174 may be sized and spaced to match with the segments of the quench ring 22. Thus, the arcuate floor segments 174 and the quench ring 22 segments may be installed or removed together. In other embodiments, the arcuate floor segments 174 may be sized and/or spaced differently from the quench ring 22 segments or from one another. Finally, the number of seams 176 provided in the floor plate 64 may be based in part on the size of the maintenance opening of the gasifier 10.

Figure 9:
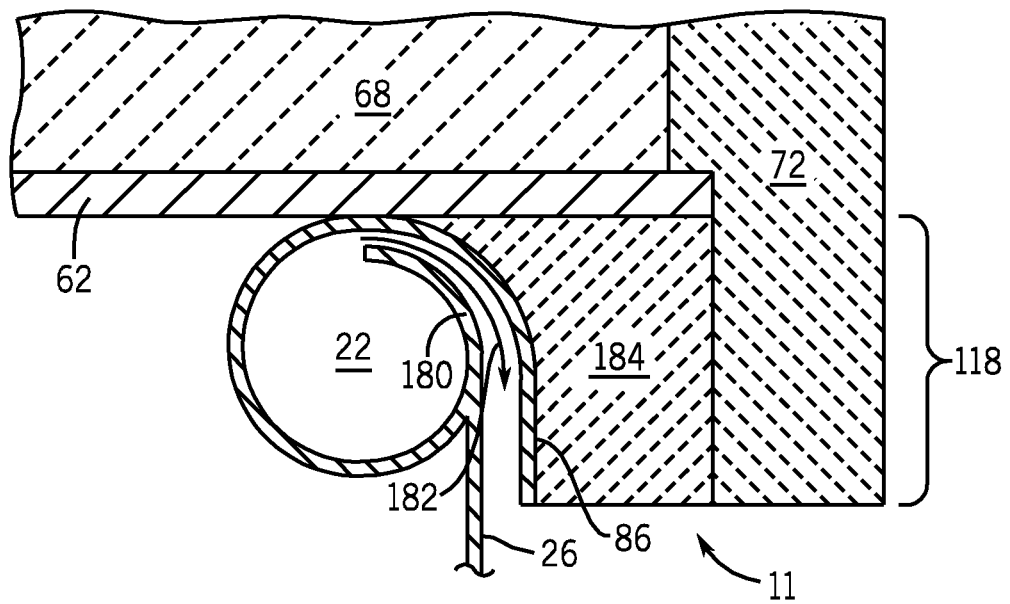
FIG. 9 is a partial cross-sectional view of a quench ring protection system according to an embodiment.

FIG. 9 is a partial cross-sectional view of an embodiment of the quench ring protection system 11. Elements in FIG. 9 in common with those shown in earlier figures are labeled with the same reference numerals. In the illustrated embodiment, the top of the dip tube 26 extends from a middle portion 180 of the quench tube 22. Thus, water from the quench ring 22 flows over the middle portion 180 and then down the surface of the dip tube 26, as indicated by cooling path 182. The cooling path 182 also brings the water in contact with the inner circumferential surface 86, which helps to cool the inner circumferential surface 86. In other words, the quench ring 22 includes the cooling path 182 of the water flow exiting the quench ring 22 and extending along the inner circumferential surface 86. The cooling path 182 may also include the swirling motion 142 of the embodiment illustrated in FIG. 6. A castable refractory 184 may be disposed between the inner circumferential surface 86 and the throat refractory 72. The castable refractory 184 may help further protect the inner circumferential surface 86 from the effects of the synthetic gas and/or molten slag. In addition, the overhanging portion 118 of the throat refractory 72 (e.g., annular protective barrier) and the castable refractory 184 completely overlap the quench ring 22 in the axial direction along the axis 88. Thus, the throat refractory 72 and the castable refractory 184 define the protective barrier for the quench ring 22 in the radial direction relative to the axis 88. In other embodiments, the throat refractory 72 and/or the castable refractory 184 may only substantially overlap the inner circumferential surface 86. In other words, the throat refractory 72 and/or the castable refractory 184 may overlap greater than approximately 50 percent, 60 percent, 70 percent, 80 percent, or 90 percent of the inner circumferential surface 86. Thus, the combination of the inner circumferential surface 86, the cooling path 182, the castable refractory 184, and the throat refractory 72 may constitute the quench ring protection system 11. Other aspects of the quench ring protection system 11, shown in FIG. 9, are similar to embodiments described in detail above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a gasifier, comprising:
a reaction chamber configured to convert a feedstock into a synthetic gas;
a quench chamber configured to cool the synthetic gas;
a throat opening disposed between the reaction chamber and the quench chamber, wherein the throat opening is configured to enable the synthetic gas flow from the reaction chamber to the quench chamber;
a quench ring configured to provide a water flow to the quench chamber, wherein the quench ring comprises an outer annular segment and an inner annular segment coupled to one another, the inner annular segment has an inner circumferential surface, the quench ring is coupled to a dip tube configured to extend into water located in a quench chamber sump of the quench chamber, and the quench ring is disposed adjacent to the throat opening; and
a quench ring protection system configured to protect the quench ring from the synthetic gas or a molten slag, wherein the quench ring protection system comprises a protective barrier disposed within the inner circumferential surface of the quench ring, the quench ring protection system comprises a drip edge configured to locate dripping molten slag away from the quench ring, the protective barrier substantially overlaps the inner circumferential surface along greater than approximately 50 percent of a portion of an axial dimension in an axial direction along an axis of the quench ring, and the protective barrier comprises a refractory material.

2. The system of claim 1, wherein the protective barrier completely overlaps the inner circumferential surface in the axial direction along the axis of the quench ring.

3. The system of claim 1, wherein the refractory material of the protective barrier comprises a ceramic material.

4. The system of claim 1, wherein the protective barrier directly contacts the inner circumferential surface.

5. The system of claim 1, wherein the protective barrier is radially offset from the inner circumferential surface to define a recirculation region between the protective barrier and the quench ring.

6. The system of claim 1, wherein the quench ring comprises a tangential inlet nozzle configured to impart a swirling motion to the water flow along a rotational path of the water flow within an annular interior of the quench ring.

7. The system of claim 1, wherein the quench ring comprises a surface cooling path of the water flow exiting the quench ring and extending along the inner circumferential surface.

8. The system of claim 1, wherein the quench ring comprises a plurality of radial slots disposed along the inner circumferential surface.

9. The system of claim 1, wherein the quench ring comprises a plurality of arcuate ring segments spaced circumferentially about the axis of the quench ring.

10. The system of claim 1, comprising a transition section between the reaction chamber and the quench chamber, wherein the transition section comprises a conical refractory section and a removable floor section, the removable floor section comprises a plurality of arcuate floor segments, and the quench ring comprises a plurality of arcuate ring segment that are coupled to the plurality of arcuate floor segments of the removable floor section.

11. The system of claim 1, wherein the quench ring comprises a protective coating disposed along the inner circumferential surface.

12. The system of claim 1, wherein the dip tube is disposed downstream of the quench ring in a direction of flow of the synthetic gas.

13. The system of claim 1, wherein the drip edge comprises a plurality of overlapping drip edges, a first overlapping drip edge of the plurality of overlapping drip edges comprises a first diameter, a second overlapping drip edge of the plurality of overlapping drip edges comprises a second diameter, the first diameter is less than the second diameter, and the second overlapping drip edge is disposed downstream of the second overlapping drip edge in a direction of flow of the synthetic gas.

14. The system of claim 1, wherein a quench ring diameter of the quench ring is approximately equal to a throat diameter of the throat opening.

15. A system, comprising:
a quench ring, wherein the quench ring comprises an outer annular segment and an inner annular segment coupled to one another, the inner annular segment has an inner circumferential surface, and the quench ring is disposed adjacent to a throat opening ; and
a quench ring protection system configured to protect a quench ring from hot products of gasification, wherein the quench ring protection system comprises a refractory barrier configured to mount within the inner circumferential surface of the quench ring, the quench ring protection system comprises a drip edge configured to locate dripping molten slag away from the quench ring, the refractory barrier is configured to substantially block the inner circumferential surface along greater than approximately 50 percent of a portion of an axial dimension in a radial direction relative to an axis of the quench ring, and the quench ring is configured to couple to a dip tube that extends into water located in a quench chamber sump of a quench chamber.

16. The system of claim 15, wherein the refractory barrier is configured to completely block the inner circumferential surface in the radial direction relative to the axis of the quench ring.

17. The system of claim 15, wherein the quench ring comprises at least one of a rotational path of a water flow within an annular interior of the quench ring, or the quench ring comprises a surface cooling path of the water flow exiting the quench ring and extending along the inner circumferential surface.

18. A method, comprising:
gasifying a feedstock in a reaction chamber to generate a synthetic gas;
flowing the synthetic gas through a throat opening disposed between the reaction chamber and a quench chamber;
quenching the synthetic gas in the quench chamber to cool the synthetic gas, wherein quenching comprises providing a water flow from a quench ring disposed adjacent to the throat opening, wherein the quench ring comprises an outer annular segment and an inner annular segment coupled to one another, and the inner annular segment has an inner circumferential surface;
flowing the water flow from the quench ring to a dip tube coupled to the quench ring;

flowing the water flow along the dip tube into a quench chamber sump of the quench chamber, wherein the dip tube extends into water in the quench chamber sump;

protecting the quench ring with a refractory barrier completely overlapping the inner circumferential surface of the quench ring along greater than approximately 50 percent of a portion of an axial dimension of the quench ring; and locating dripping molten slag from the reaction chamber away from the quench ring using a drip edge of the refractory barrier.

19. The method of claim 18, comprising circulating the water flow along a rotational flow path within an annular interior of the quench ring.

* * * * *